United States Patent
Kasargod et al.

[15] 3,644,767
[45] Feb. 22, 1972

[54] SEGMENTED STATOR

[72] Inventors: Sadanand Vithal Kasargod; Shreeniwas Shankar Abhyankar, both of c/o Electronics Corporation of India Ltd., Hyderabad, India

[22] Filed: Mar. 23, 1970

[21] Appl. No.: 21,862

[52] U.S. Cl. ............................... 310/254, 310/187, 310/194
[51] Int. Cl. ........................................................ H02k 1/12
[58] Field of Search ............... 310/254, 258, 180, 194, 187, 310/188, 218, 40 MM

[56] References Cited

UNITED STATES PATENTS

| 455,517 | 7/1891 | Riker | 310/258 |
|---|---|---|---|
| 485,220 | 11/1892 | Pepper | 310/258 |
| 1,353,658 | 9/1920 | Kostko | 310/258 |
| 2,145,791 | 1/1939 | Gille | 310/218 |
| 2,192,985 | 3/1940 | Reis | 310/258 X |
| 2,251,674 | 8/1941 | Gillen | 310/254 |

Primary Examiner—William M. Shoop, Jr.
Assistant Examiner—R. Skudy
Attorney—McGlew & Toren

[57] ABSTRACT

In the segmented stator assembly disclosed, four teeth extend inwardly, and rectangularly relative to each other, from surrounding segments. The teeth form a bore at the center of the assembled segments. Each tooth has two parallel edges one of which extends along a line passing through the center of the bore. The centerline of each tooth is offset from the bore center. Coil-carrying bobbins are mounted on respective teeth so their axes coincide with the centerlines of the teeth on which they are mounted. The offset of each bobbin leaves space for intrusion of an edge of the transversely directed adjacent bobbin.

7 Claims, 5 Drawing Figures

PATENTED FEB 22 1972

Inventor
SADANAND V. KASARGOD
SHREENIWAS S. ABHYANKAR
By
Attorney

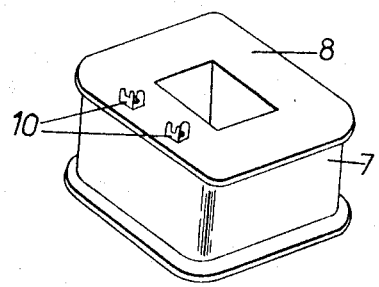
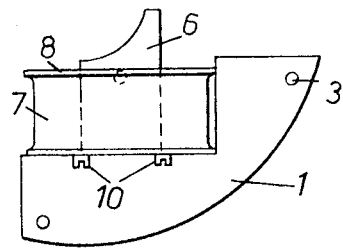
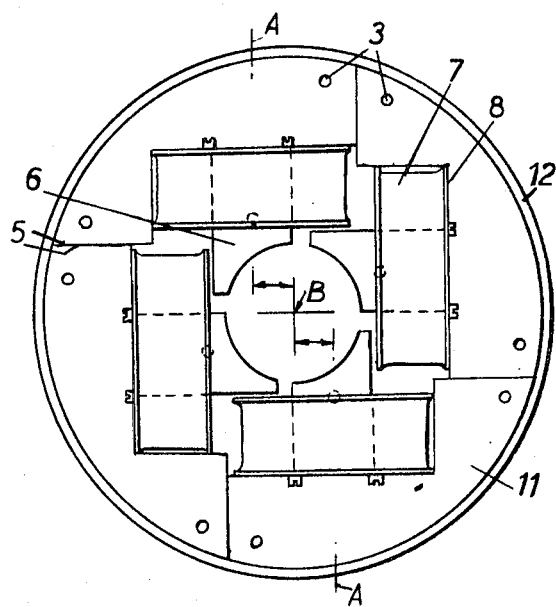

SEGMENTED STATOR

This invention relates to a segmented stator adapted for use in electromechanical devices such as fractional horsepower induction motors, induction-type relays, rotary solenoids or differential transformer type position sensors.

As known in the art, an important problem that arose in the construction of such stators, for example in fractional horsepower motors was the difficulty of winding stators having relatively small bores. Because of the small bore size, it was found difficult to manually insert the coils in the stator slots. In order to obviate this difficulty, the stator now comprises a plurality of stator segments. Segmented stators are known in the art, which comprise a plurality of segments and wherein a bobbin or former having a coil wound thereon is held onto the tooth of each segment. One particularly known construction consists of a stator having eight such segments, each of said segments having a tooth holding a bobbin carrying the coil. In such a construction, the center line of each of the tooth passes through the center of the bore circle. One advantage of such a construction, namely of a stator having eight segments, is that it allows an easy winding of the coils on the stator. However, an essential disadvantage of such a known construction of a segmented stator is that is was necessary to provide a four-pole winding for the stator, as opposed to a two-pole winding which would be more efficient for a given radial airgap between the stator and the rotor. A further disadvantage of such a known construction is that the coils were not of a uniform rectangular cross section. This would be apparent since the slots formed between the teeth of adjacent segments of an eight-piece segmented stator could not provide the required slot shape for the introduction of coils with uniform rectangular cross section. Another disadvantage associated with such a known construction is with regard to the introduction of the bobbins or formers on the teeth. Since each tooth was widened at its top with the dual objective of lowering the magnetic reluctance of associated airgap and securely confining the coils to the slots between the teeth, a complete bobbin having a prewound coil thereon could not, as such, be introduced onto a tooth. For this purpose, it was necessary to assemble the bobbin, in separate parts, on a tooth of a segment, and thereafter finally wind the coil on the bobbin held to the tooth of said segment.

An object of this invention is to propose a construction of segmented stator suitable for use in electromechanical devices and which avoids the disadvantages associated with the prior art.

A further object of this invention is to propose a segmented stator wherein the said stator is assembled from four segments only, whereby it is enabled to receive a two-pole winding.

Yet another object of this invention is to propose a segmented stator wherein a coil is prewound on a bobbin or former prior to introduction onto the tooth of a segment forming said stator.

SUMMARY OF THE INVENTION

According to this invention there is provided a segmented stator, suitable for use in electromechanical devices such as fractional horsepower induction motors, induction-type relays, rotary solenoids or differential transformer type position-sensors, consisting of four individual segments assembled together to form said stator, each of said segments having a tooth depending therefrom and adapted to directly receive a bobbin or former, the centerline of said tooth being offset from the center of the bore circle.

Further objects and advantages of this invention will become apparent from the ensuing description when read in conjunction with the accompanying drawings, wherein:

BRIEF DESCRIPTION OF THE DRAWINGS

FIG. 3 shows a bobbin carrying a winding;

FIG. 4 shows a stator segment onto which a prewound bobbin has been introduced;

FIG. 5 shows the assembled stator together with the bottom carrying windings.

DESCRIPTION OF PREFERRED EMBODIMENTS

Figure 2:
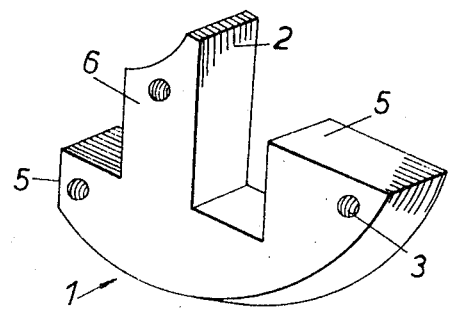
FIG. 2 shows one of the four segments incorporated in said stator.

Referring to the drawings, and in particular to FIG. 2, there is shown a stator segment 1 consisting of a number of laminations 2 stacked and riveted together at point 3. The advantages of such a laminated structure are already known in the art.

Figure 1:
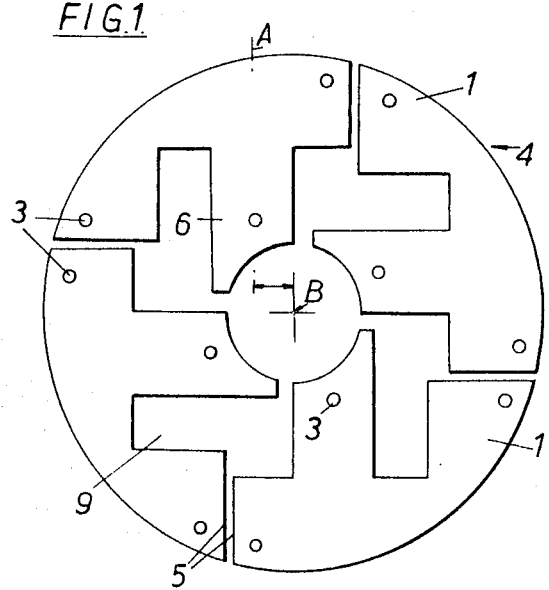
FIG. 1 shows a plan view of the assembled stator without the stator windings.

An assembly of four such segments 1 constitutes the complete stator 4 as shown in FIG. 1. The joint between adjacent segments 1, as shown in FIG. 1, is constructed by the plane surfaces 5 in contact and thereby resulting in a single plane contact. However, in order to reduce the magnetic reluctance between adjacent segments, it is also possible to provide a tongue-and-groove joint giving enhanced contact between the adjacent segments 1 (not shown).

As will be apparent from FIG. 1, the center line A of each tooth 6 is offset from the center B of the stator bore circle. The provision of a tooth 6 with such an offset center line A forms one of the important aspects of this invention in that by such a provision, the following advantages accrue;

1. It is possible to secure a higher tooth inner area and a lower airgap magnetic reluctance, without having to widen the tooth 6 at the top;
2. As no widening of the tooth 6 is required at its top, a coil 7 may be prewound on a bobbin 8, and the bobbin 8 carrying the coil subsequently slipped over the tooth 6 on each segment 1.
3. When the segments 1 are assembled, the coil 7 on each segment is preferably confined to the slot space 9 by adjacent segment;
4. Coils of a uniform rectangular cross section can be used, without sacrificing slot space.

Another important aspect of the present invention is that only four segments are used in the assembly of the stator 4, as opposed to eight segments used in the stators known in the prior art. The use of only four segments not only facilitates manufacture but also enables a two-pole winding for the stator 4 as opposed to four-pole winding which only is possible on stators with eight segments. A two-pole winding permits the use of larger airgaps between the stator and rotor in order to achieve a given efficiency, as compared to a motor with four-pole winding. The advantage of a larger airgap is that it makes the manufacture of such motors easier.

Reference is now made to FIG. 3 which illustrates a bobbin or former S, carrying a winding or coil 7 whose ends are brought out to the two terminals 10. In accordance with this invention, the coils are prewound on a former or bobbin 8, suitably impregnated in a known manner, and thereafter slipped on to the tooth 6 of a segment 1 as shown in FIG. 4. Thus, whereas in the prior known construction, such a bobbin 8 having a prewound coil 7 thereon, could not be slipped onto the tooth 6 of a segment 1 such a procedure is now possible with the segments 1 of the present invention. Further, since the coils 7 have a uniform rectangular cross section and can be prewound onto a bobbin 8 prior to its introduction in the segments 1, multiple coil winding with standard coil-winding machines intended for that purpose, becomes readily possible.

Referring now to FIG. 5, a complete stator assembly 11 comprising four of said segments 1, each of the said segments 1 carrying a bobbin 8 with prewound coil 7, held together within a cylindrical outer shell 12 is shown. However, the segments 1 can also be assembled without the shell 12 by making use of the motor and shields (not shown) to hold the segments together. The coils 7 on the individual segments 1 are interconnected in a manner appropriate to the electric supply, whether single phase, two phase or three phase, from which the motor is to operate.

We claim:

1. A segmented stator assembly, comprising four individual segments assembled together to form a stator, each of said segments having a tooth extending inwardly of the stator for receiving a bobbin, a total number of teeth in said stator being four, the length of said teeth being rectangularly oriented relative to each other, said teeth forming a center bore, the centerline of each of said teeth being offset from the center of the bore, each of said teeth having a longer side and a shorter side, radial lines extending from the center of said bore parallel to the centerlines of said teeth being closer to said shorter sides of said teeth than to the centerline thereof.

2. An assembly as in claim 1, wherein each of said teeth includes parallel edges and forms an inner end and a body, the inner end having a width in a range whose maximum is equal to the width of the body so as to allow direct axial insertion of the bobbin.

3. A stator assembly as in claim 1, wherein a bobbin is mounted on each of said teeth, each of said bobbins including respective coils wound thereon.

4. A stator assembly as in claim 3, wherein said coils wound on the bobbin have uniform rectangular sections.

5. A stator assembly as in claim 1, wherein the centerlines of each of said teeth is offset so that radial lines extending parallel to each of the centerlines intersects the tooth having a centerline to which the radial line is parallel.

6. A stator assembly as in claim 5, wherein a bobbin is mounted on each of said teeth, each of said bobbins including respective coils wound thereon.

7. A stator assembly as in claim 1, wherein the centerline of each of said teeth is offset from the center of the bore such that radial lines extending from the bore center to the points of intersection of the inner face and the shorter of the two sides of each of said teeth, are substantially parallel to the centerlines of the teeth to which the radial lines are drawn.

* * * * *